United States Patent
Baioff et al.

(10) Patent No.: US 6,378,220 B1
(45) Date of Patent: Apr. 30, 2002

(54) MEASURING TOOL USABLE WITH A PAINT APPLICATOR

(75) Inventors: Danny Baioff, Tecumseh; David A Tiessen, Cottam; Gil Boucher, Tecumseh, all of (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/546,767

(22) Filed: Apr. 11, 2000

(51) Int. Cl.$^7$ ................................................ G01B 1/00
(52) U.S. Cl. ............................. 33/502; 33/613; 33/560; 116/35 R; 116/209
(58) Field of Search ........................... 116/28 R, 35 R, 116/51, 52, 53, 209; 33/502, 600, 613, 645, 700, 701, 557, 559, 560; 427/8; 118/712, 713; 239/73

(56) References Cited

U.S. PATENT DOCUMENTS

| | | |
|---|---|---|
| 2,232,824 A | 2/1941 | Maher |
| 2,356,544 A | 8/1944 | Swanson |
| 2,540,292 A | 2/1951 | Ritchie |
| 3,709,190 A | 1/1973 | Von Gottberg et al. |
| 4,218,824 A * | 8/1980 | Schaefer ........................ 33/613 |
| 4,543,732 A * | 10/1985 | Maples .......................... 33/502 |
| 4,614,356 A * | 9/1986 | Mills ............................. 33/645 |
| 4,982,897 A | 1/1991 | Matusita et al. |
| 5,103,761 A | 4/1992 | Ishibashi et al. |
| 5,186,119 A * | 2/1993 | Hlavin ........................ 116/209 |
| 5,207,175 A * | 5/1993 | Andonian ................... 116/209 |
| 5,240,745 A | 8/1993 | Yamamoto et al. |
| 5,645,895 A | 7/1997 | Murayama et al. |
| 5,744,190 A * | 4/1998 | Thome ........................... 427/8 |
| 5,876,803 A * | 3/1999 | Hissen et al. ................. 427/8 |
| 6,318,288 B1 * | 11/2001 | Aspinwall et al. ............ 116/51 |

* cited by examiner

Primary Examiner—G. Bradley Bennett
(74) Attorney, Agent, or Firm—Ralph E. Smith

(57) ABSTRACT

The spacing between a paint applicator and an auto body surface can be measured by a tool that is screwable onto the applicator in place of the paint spray head. The measuring tool includes a mounting fixture and a deflectable wand having an effective length that corresponds to an optimum spacing between the auto body surface and paint applicator. The paint applicator can be calibrated (adjusted) while the measuring tool is affixed to the applicator. All paint applicators in the system can be calibrated by a single pass of an auto body through the paint booth in which the paint applicators are located.

14 Claims, 2 Drawing Sheets

MEASURING TOOL USABLE WITH A PAINT APPLICATOR

BACKGROUND AND SUMMARY OF THE INVENTION

This invention relates to a measuring tool that can be used to adjust the distance between a paint applicator and an external surface of an automotive body. Proper adjustment of the paint applicator in a paint booth promotes the even (consistent) application of a paint coat onto the surface of an automotive body while the body is being conveyed through the paint booth (during initial manufacture of the automotive vehicle).

During vehicle manufacturing operations, the vehicle body is often painted in a painting booth, or tunnel, that has various rooms (or chambers) for performing various operations on the auto boy, e.g. cleaning the body surface, applying colorant and clear coat to the body surface, and drying the auto body surface to prevent one coat from flowing or merging with another coat.

Many of the painting operations are performed automatically by automatic paint spray devices stationed at different points along the tunnel, for spraying paint onto specific areas of the vehicle body while the auto body is being conveyed through the tunnel at a relatively constant slow velocity. Such paint spray devices can take the form of electrostatic sprayers having rotary spray heads (or spray bells), as shown e.g. in U.S. Pat. No. 5,353,995 issued to P. Chabert. The paint can be supplied to the individual sprayers as a pressurized fluidized power.

The sprayers can be arranged in banks alongside the path taken by the vehicle body. U.S. Pat. No. 3,709,190 to H. Von Gottberg et al and U.S. Pat. No. 5,427,619 to P. Ehinger show some sprayer arrangements that can be used to obtain complete coating coverage of a vehicle body.

For optimum performance, each spray device should be spaced from the vehicle surface by a predetermined distance, e.g. eight or nine inches. The optimum spacing can vary from one sprayer size (or sprayed material) to another sprayer size (or material). If the sprayer head is too close to the auto body surface the coating may discolor due to burning associated with excessively high voltages. If the sprayer head is too far away from the auto body the coating can be excessively light or uneven.

In some situations the spray device can be mounted in a stationary position along the path taken by the auto body. In other situations, the spray device is movable in a direction transverse to the auto body path, in order to keep the spray device at a constant distance from the contoured auto body surface while the surface is moving incrementally toward or away from the spray device. In either situation load forces associated with operation of the spray devices can cause the spray devices to lose its adjustment; an individual spray device can shift toward or away from the path of the auto body surface, so that the quality of the paint coating on the auto body surface is degraded.

Typically, upwards of twenty five paint spray devices are required to provide complete coverage of an auto body. Should any one of the spray devices shift out of adjustment the entire auto body painting operation may be adversely affected, requiring a repainting operation. Therefore, it is necessary that all paint spray devices in the system be in proper adjustment.

The present invention relates to a low cost simplified tool that can used for readily adjusting the distance between a paint spray head (or bell) and an auto body surface. Preferably the tool is adjustable so that it can be used for setting a spray head at different distances from an auto body surface, in accordance with various different optimum distances that might be required in different situations. In one particular tool construction, the tool can be adjusted in one half inch increments to set the spray head-auto body surface spacing in a range from eight inch to ten inch. The same tool construction can be used for adjusting various different spray devices in the paint spray system.

The tool of the present invention can include a deflectable probe extending though a mounting fixture, so that when the fixture is temporarily placed on a paint applicator (spray device) the probe extends a predetermined distance from the applicator (i.e. the same distance as the optimum spray head-auto body surface spacing for the paint applicator). The probe is adjustable on the mounting fixture, whereby the probe can extend different distances from the paint applicator, depending on the adjusted position of the probe on the fixture.

Adjustment or testing of the paint spray—auto body surface spacings is carried out when the painting tunnel is inactive, i.e. not being used for painting vehicles. The testing operations can be performed at predetermined intervals (e.g. monthly) or when the quality of the painting operation suggests that one or more of the spray devices has a shifted out of adjustment, i.e. when the spray head-auto body surface spacing is not optimum.

In usage of the measuring tool, one measuring tool is installed on each paint spray applicator in the system. For example, in a system using thirty paint applicators, a measuring tool will be installed on each paint applicator, so that all thirty paint applicators can be tested on one pass of the auto body through the tunnel. Each deflectable probe has a free end, or tip, that represents the expected location of an auto body surface when the surface is aligned with the respective paint applicator in the paint booth.

A representative vehicle body is moved through the tunnel (on the usual conveyor) so that the vehicle body takes the same path it would take during an actual painting cycle. No powder is supplied to the paint applicators during the test. Instead, one or more technicians view the various probes while the auto body is in variouspositions that it would have during actual paint spray operating periods.

Each probe is viewed with respect to the location of the probe tip in relation to the associated surface of the auto body. If a particular probe is in a deflected condition, (due to oblique contact with the auto body surface), this is an indication that the spacing between the paint applicator and the auto body surface is less than it should be. If a free space is observed between the tip of the probe and the surface of the auto body, this is an indication that the spacing between the paint applicator and the auto body is greater than it should be.

With the probes still installed on the paint applicators, the spray heads (or applicators) are adjusted so that the tips of the probes are in contact with associated surfaces on the auto body, without any probe deflection. The testing and adjusting operations are carried out with the vehicle body in various stand-still locations, corresponding to the positions that the body would have while going through an actual painting cycle.

The measuring tool herein proposed, is advantageous in that it can be used to make accurate and consistent measurements. Also, the measuring tool can remain on the paint applicator while the applicator is being adjusted, so that the magnitude of the adjustment corresponds precisely to the inaccuracy measured by the tool. The tool is cost—effective because the tool can be installed and operated by a single person.

Specific features of the invention will be apparent from the attached drawings and description of an illustrative tool embodying the invention.

DESCRIPTION OF A PREFERRED EMBODIMENT OF THE INVENTION

Figure 1:
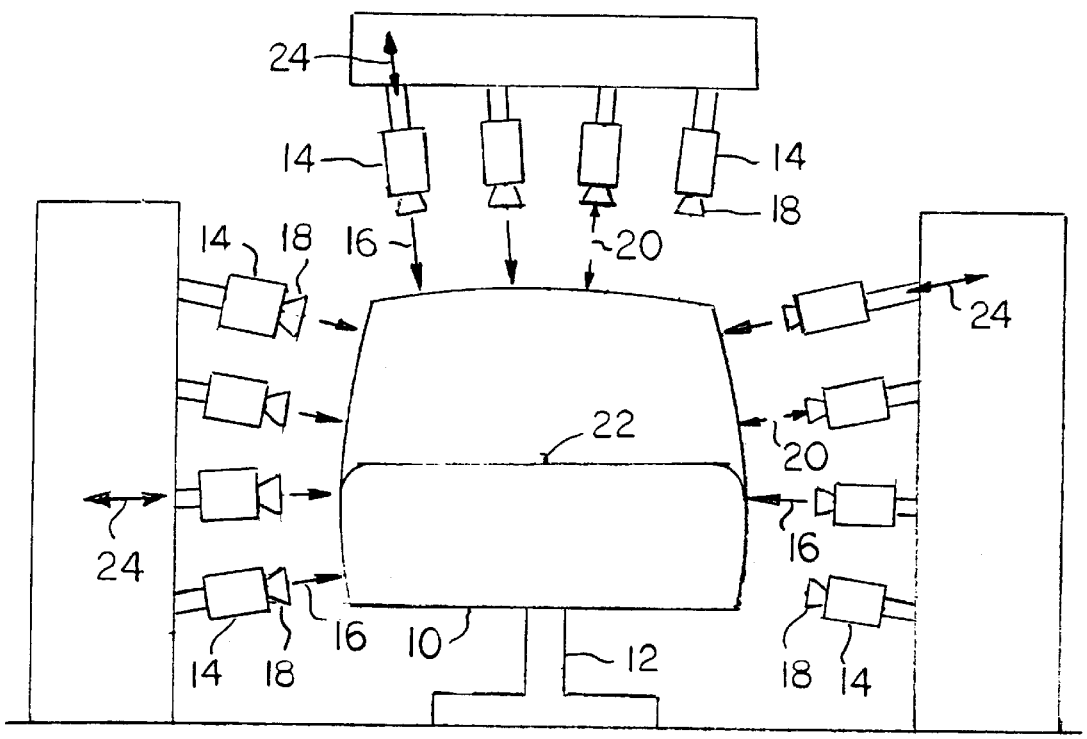
FIG. 1 is transverse view taken through a painting booth having a system of paint applicators that can be adjusted by the use of a measuring tool constructed according to the present invention.

Referring to FIG. 1, there is fragmentarily shown a paint spray booth for painting an auto body 10 in a vehicle production environment. The auto body is placed on a conveyor 12, which moves slowly through the paint booth past banks of paint applicators 14 stationed at various locations along the booth. Usually there are upwards of twenty five paint applicators in the booth for applying two or more coats to various surfaces of the auto body, including the roof, hood, fenders, etc. Some painting operations are performed manually by human technicians.

Each paint applicator 14 is programmed to apply paint to the auto body surface only while the surface to be painted is aligned with the particular applicators. In FIG. 1, the direction of paint flow onto the auto body surface is designated by numeral 16, i.e. normal to the auto body surface. Typically, the paint flows from the paint applicator head 14 onto the auto body surface as a conical spray of finely divided paint particles.

In many situations, the paint applicator 14 is an electrostatic spray device, wherein applicator head 18 is a rotary ionizer head having a bowl (or bell) shape, whereby the electrically charged paint powder has a conical spray pattern as it flows from the head toward the auto body surface. The paint applicator can be constructed generally as shown in U.S. Pat. No. 5,353,995.

For optimum performance the paint applicator should be spaced a predetermined distance 20 from the auto body surface. The applicator—auto body surface spacing 20 can vary for different applicators in the system. For example, the optimum spacing 20 can be eight inch for one applicator and nine inch for another applicator. Spacing distance 20 will typically vary from eight inch to ten inch, in one half inch increments.

If the paint applicators 14 were to be fixedly mounted along the path taken by the auto body, the spacing distances 20 between the auto body surfaces and the individual paint applicators 14 would tend to vary incrementally, due to the fact the auto body surface is contoured or sloped toward or away from the auto body centerline 22, i.e the auto body surfaces are curved, not flat. To maintain the spacing distances 20 relatively constant during applicators, at least some of the paint applicators can be programmed to move incrementally toward or away from the auto body center line 22 as the auto body is moved past the respective applicators. The paint applicators may be shifted incrementally back and forth, e.g. by rack—and—pinion mechanisms, as indicated by arrows 24 in FIG. 1.

During prolonged usage of the paint booth, load forces can cause the paint applicators to lose adjustment, such that the distance 20 between the paint applicator and auto body surface becomes less than the optimum value, or greater than the optimum value. In either case the quality of the painting operation can be adversely affected. The present invention is concerned with a low cost manual tool that can be temporarily attached to each paint applicator to measure the distance 20 between the applicator and the auto body surface. The distance—measuring operation for all paint applicators in the system can be carried out on a pre-established schedule (e.g. Monthly), or intermittently when variations in work product quality suggest the need for readjustment of one of more paint applicators in the system.

Figure 2:
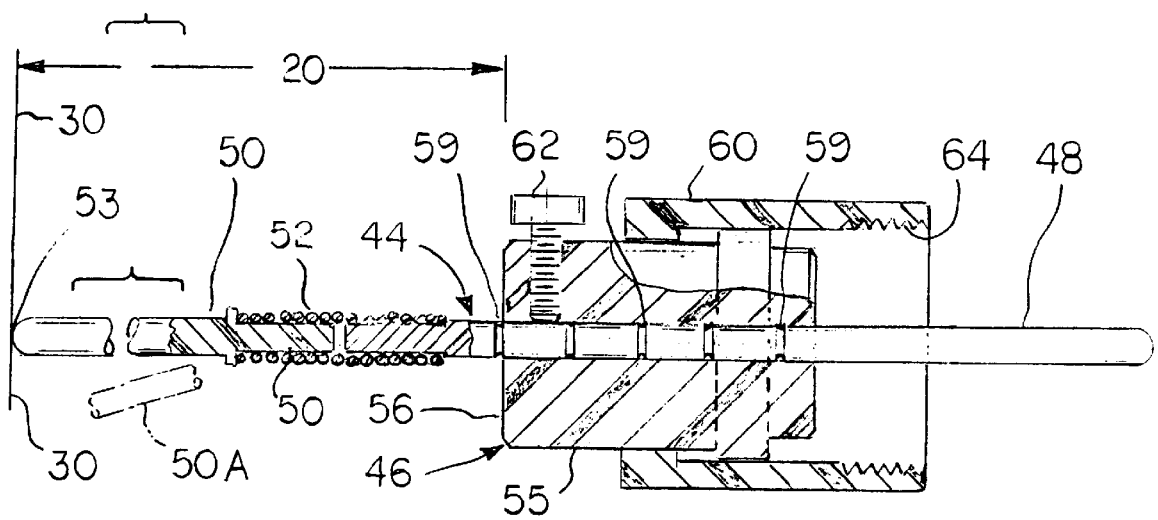
FIG. 2 is a longitudinal sectional view taken through a measuring tool embodying the invention.
Figure 3:
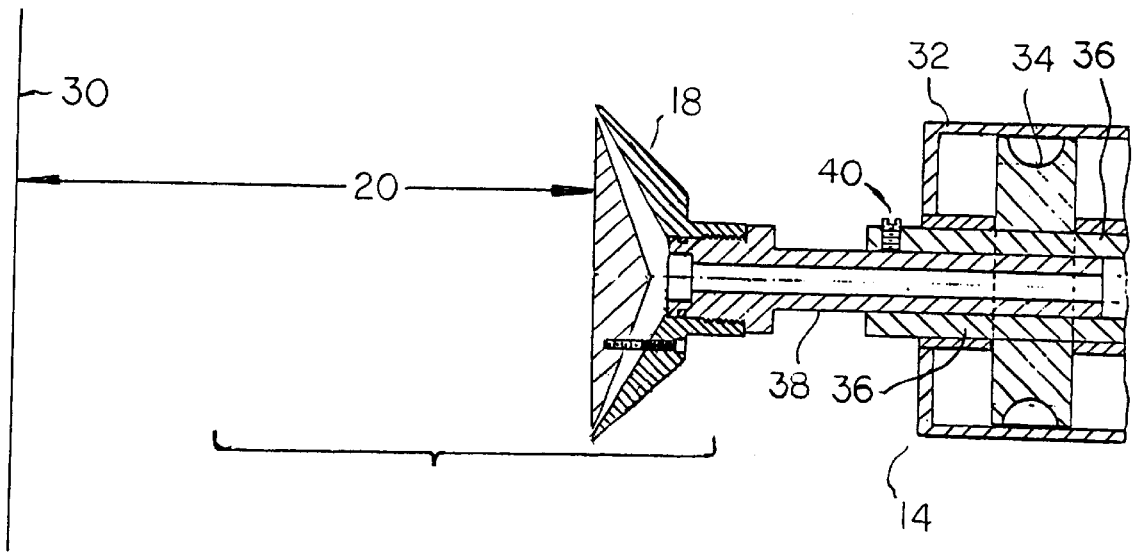
FIG. 3 is a view showing a typical spatial relationship between a paint applicator and auto body surface during a painting operation.
Figure 4:
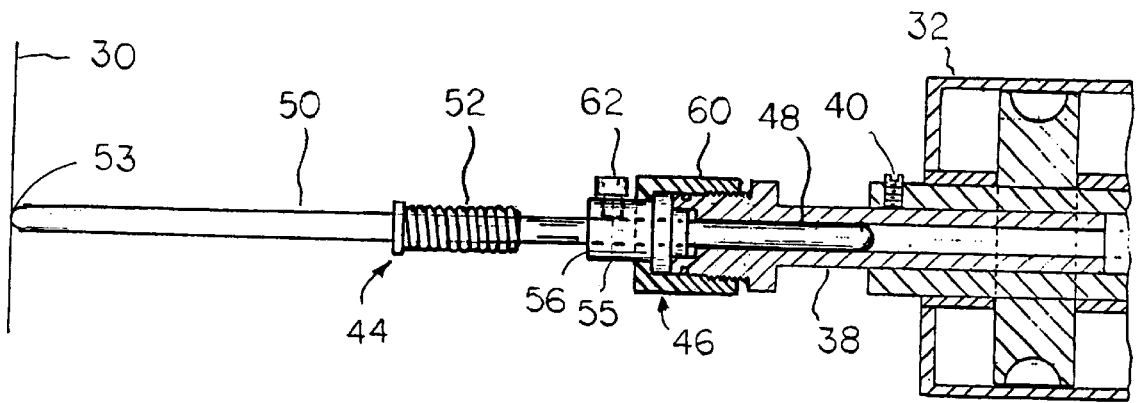
FIG. 4 is a view taken in the same direction as FIG. 3, but with a measuring tool of the present invention installed on the paint applicator.

FIG. 3 illustrates the spatial relation between a typical paint applicator 14 and an auto body surface 30. The applicator head 29 is spaced from an auto body surface 30 by a spatial distance 20. In order to measure spatial distance 20 under the present invention, it is necessary to first remove paint applicator head 18 from the paint applicator body. A measuring tool of the present invention is then screwed onto the paint applicator body in place of the paint applicator head. FIG. 4 shows the FIG. 3 construction after the applicator head has been replaced by the measuring too. FIG. 2 shows some features of the measuring tool that are not apparent from FIG. 4.

As depicted in FIG. 3, the paint applicator 14 includes a housing 32 for an air turbine 34 that is mounted on a tubular conduit 36 for airborne coating powders traveling in a right—to—left direction. Paint applicator head 18 is removably attached to a tubular conduit 38 that is slidably adjustable on conduit 36, whereby spray head 18 can be adjusted toward or away from auto body surface 30. One or more set screws 40 can be used to retain conduit 38 in adjusted positions on conduit 36.

Conduit 38 forms a passage member for conveying the fluidized coating powders from passage 36 into the rotary spray head 18. The rotary spray head is connected to a high voltage source for ionizing the fluidized coating powders, as outlined in the aforementioned U.S. Pat. No. 5,353,995.

Spray head 18 may be removably attached to conduit 38 by a threaded connection that includes an internal female thread on the hub portion of spray head 18 and a male thread on the end portion of conduit 38. After applicator head 18 has been unscrewed from conduit 38, the measuring tool of the present invention can be temporarily attached to conduit 38, as shown in FIG. 4.

FIG. 2 shows some features of a measuring tool constructed according to the invention. The tool includes an elongated probe 44 extending through a mounting fixture 46. The probe includes a wand support rod 48 and a rod—like deflectable wand 50 normally aligned with the support rod. A coil spring 52 tightly encircles adjacent end areas of support rod 48 and wand 50, whereby the wand forms a deflectable extension of rod 48. In the absence of a deflecting force, wand 50 is axially aligned with support rod 48, as shown in FIG. 2. Should the auto body forcibly contact tip 53 of wand 50, the wand will deflect, as indicated by dashed line 50 A in FIG, 2. Wand 50 is preferably formed of relatively soft plastic or hard rubber, such that when the tip 53 of the wand is brought into rubbing contact with auto body surface 30 the surface will not be scratched. Tip 53 of the wand is preferably spherical, so that any gap between tip 53 and the auto body surface is readily observable.

Mounting fixture 46 includes an annular abutment sleeve 55 slidable on wand support rod 48, and a locking collar 60 rotatable on abutment member 55. A manual set screw 62 is threaded transversely through a hole in member 55 to engage a side surface of rod 48, whereby the rod can be locked in selected positions of axial adjustment relative to sleeve 55.

Markings are provided along the surface of rod 48 to indicate various adjusted positions of the rod relative to end surface 56 of the abutment sleeve 55. As shown in FIG. 2, there are five markings equidistantly spaced along rod 48. Each marking takes the form of a narrow annular groove 59 machined into the side surface of rod 48. The probe is dimensioned so that when rod 48 is adjusted to the FIG. 2 position in abutment sleeve 55, the tip 53 of the deflectable wand is spaced from end surface 56 by a distance that corresponds to an optimum spacing 20 between a particular paint applicator and auto body surface 30. Rod 48 can be adjusted leftwardly from the FIG. 2 position so that the other reference grooves 59 selectively align with end surface 56 of abutment sleeve 55. In each adjusted position of the probe, the tip 53 of the probe is spaced from reference surface 56 by a distance that corresponds to an optimum spacing distance 20 for one particular paint applicator.

The marking arrangement depicted in FIG. 2 accommodates five different applicator—auto body surface spacings 20 (i.e. five different applicator constructions). In one contemplated arrangement the five different spacings can range from eight inch (as shown in FIG. 2) to ten inch, in one half inch increments.

Rotary collar 60 has an internal female thread 64 adapted to mesh with a male thread on end of conduit 38 (FIG. 3). When probe 44 is positioned on conduit 38, as shown in FIG. 4, collar 60 can be threaded onto conduit 38 to lock the probe 44 in a fixed position relative to conduit 38. Abutment sleeve 55 abuts the end of conduit 38 so that reference end surface 56 is spaced a predetermined distance from the end of conduit 38. In a preferred tool construction sleeve 55 is dimensioned so that reference surface 56 is in the same plane as the discharge face of spray head 18 (when the spray head is attached to conduit 38). Therefore the distance between reference surface 56 and tip 53 of the deflectable wand corresponds to an optimum spacing between the painting applicator and the auto body surface.

In order to calibrate all of the paint applicators in the system, the spray head 18 for each paint applicator is remove from the associated powder supply conduit 38. A measuring tool is then installed on each paint applicator (e.g. by screwing collar 60 of each receptive tool onto each associated conduit 38). A representative auto body is moved slowly through the paint booth along the normal path used during a painting cycle. During the testing operation the various paint applicators are inactive, in the sense that no coating powders are supplied to the applicators.

If each paint applicator is properly calibrated, each wand 50 will make contact with an associated auto body surface when the auto body reaches the desired painting position in the booth; the wand will be in a non-deflected condition, as depicted in FIG. 2.

Should a particular wand 50 be deflected by contact with an auto body surface 30, that is an indication that the spray head—auto body surface spacing 20 is less than optimum, i.e. the spray head 1 is too close to the auto body surface. The associated set screw 40 is operated to adjust probe 44 so that tip 53 of the wand contacts the auto body surface without any deflection of the wand.

Should a particular wand be out of contact with the auto body so that there is a perceptible gap between tip 53 of the wand and auto body surface 30, that is an indication that spray head 18 is too far away from the auto body surface 30 for optimum performance of the respective paint applicator. Set screw 40 is operated to adjust probe 44 so that tip 53 makes contact with the auto body surface 30, without deflection of the wand.

The entire complement of paint applicators can be calibrated in a single pass of the test vehicle body through the paint booth. It will be appreciated that the various probes 44 will be pre-adjusted in mounting fixtures 46 so that each wand 50 projects the appropriate (optimum) distance from reference surface 56. The calibrating system is advantageous in that all paint applicators in the system can be tested and adjusted at the same time, whereby the entire surface of each auto body can have an even (consistent) coloration, without color variations from one surface area to another surface area.

It will be appreciated that some variations in the construction of the measuring tool can be employed while still practicing the invention concept.

In one particular arrangement, not shown, each probe 44 can be permanently locked to mounting fixture 46, so that tip 53 of the wand is spaced a fixed predetermined distance from reference surface 56. With such an arrangement a differently dimensioned tool would be used for each particular paint applicator.

What is claimed:

1. A tool for adjusting the distance between a paint applicator and an automotive body surface, said tool comprising:
   a probe, and
   a fixture for mounting said probe on a paint applicator; said fixture comprising an abutment member coaxial with said probe, and an internally threaded collar rotatable on said abutment member for temporarily retaining said abutment member in a fixed position relative to said paint applicator.

2. The tool of claim 1, wherein the paint applicator has a tubular paint supply passage member and a paint spray bell removably secured to said paint supply passage member, said paint spray bell being removed from said tubular paint supply passage member in order to install said tool on the paint applicator.

3. The tool of claim 1, wherein said probe is slidably adjustable on said fixture, whereby the effective length of the tool is variable to obtain different spacings between a paint applicator and an automotive body surface.

4. The tool of claim 1 wherein said probe comprises a wand support extending from said fixture, an elongated wand aligned with said wand support, and a spring means connecting said wand to said wand support, whereby said wand is resiliently deflectable when brought into contact with an automotive body.

5. The tool of claim 1, wherein the paint applicator includes a tubular paint supply conduit and a paint spray bell removably secured to said paint supply conduit, said paint spray bell being removed from said conduit in order to install said tool on the paint applicator; said probe comprising a rod extending through said abutment member for insertion into the paint supply conduit, an elongated wand aligned with said rod, and a coil spring means connecting said wand to said rod, whereby said wand is resiliently deflectable when brought into contact with an automotive body.

6. The tool of claim 5, wherein said rod is slidably adjustable relative to said abutment member, whereby the effective length of the tool is variable to obtain different spacings between a paint applicator and an automotive body surface.

7. A tool for adjusting the distance between a paint applicator and an automotive body surface, said tool comprising:

a probe insertable onto the paint applicator, a fixture slidable on said probe, said fixture having means thereon for temporarily securing the fixture to a paint applicator so that said probe extends outwardly away from the applicator;

said probe having markings thereon designating optimum spacings between the paint applicator and the automotive body surface, whereby the paint applicator can be adjusted to conform with said optimum spacings.

8. The tool of claim 7 wherein said fixture comprises a sleeve encircling said probe for abutment against a tubular paint supply conduit in the paint applicator; said probe comprising a rod slidably extending through said sleeve.

9. The tool of claim 8 and further comprising a set screw for locking said rod in selected positions of adjustment relative to said sleeve.

10. The tool of claim 7, wherein said fixture comprises a sleeve encircling said probe for abutment against a tubular paint supply passage member of the paint applicator, and an internally threaded collar rotatable on said sleeve for temporarily retaining said sleeve in a fixed position relative to the tubular paint supply passage member; said probe comprising a rod slidably extending through said sleeve.

11. The tool of claim 10 and further comprising a set screw for locking said rod in selected positions of adjustment relative to said sleeve.

12. The tool of claim 7 wherein the paint applicator includes a tubular paint supply passage member and a paint spray bell removably secured to said passage member, said paint spray bell being removed from said tubular paint supply passage member in order to install said tool on the paint applicator.

13. The tool of claim 7, wherein said markings consist of grooves spaced along said rod for selective registry with an end surface of said sleeve, whereby said end surface serves as a reference point for determining the effective length of the probe.

14. The tool of claim 7, wherein said probe comprises a wand support slidably extending through said fixture, a deflectable wand aligned with said rod, and a coil spring means connecting said wand to said rod; said wand having a spherical tip formed of a material that is incapable of scratching an automotive body surface.

* * * * *